United States Patent [19]
McConnell et al.

[11] 3,765,766
[45] Oct. 16, 1973

[54] AERIAL SURVEY

[76] Inventors: Frederick C. McConnell, 2003 Briar Cres., N.W.; George Jason, 108 Brown Cres., N.W.; Neil J. Armstrong, 5428 Bannerman Dr., N.W., all of Calgary, Alberta, Canada

[22] Filed: Aug. 30, 1972

[21] Appl. No.: 284,971

Related U.S. Application Data

[60] Division of Ser. No. 65,259, Aug. 19, 1970, Pat. No. 3,709,607, which is a continuation of Ser. No. 817,448, April 18, 1969, abandoned.

[52] U.S. Cl.................. 356/4, 178/6.8, 356/152, 250/203 R, 244/17.11
[51] Int. Cl. .......................................... G01b 11/26
[58] Field of Search .................. 356/4, 5, 141, 152, 356/172, 138; 250/203 R, 215; 244/17.11, 17.17; 33/1 T

[56] References Cited
UNITED STATES PATENTS

| | | |
|---|---|---|
| 3,603,688 | 9/1971 | Smith-Vaniz .................. 356/152 |
| 3,523,660 | 8/1970 | Atteberry et al. .............. 244/17.11 |
| 3,370,293 | 2/1968 | Green ............................. 250/203 R |
| 3,439,170 | 4/1969 | Zagone et al. ................... 356/152 |
| 3,426,146 | 2/1969 | Seaman ........................... 356/152 |
| 2,817,994 | 12/1957 | Ehrenhaft et al. .............. 356/150 |

FOREIGN PATENTS OR APPLICATIONS

| | | |
|---|---|---|
| 854,266 | 11/1952 | Germany .............................. 33/1 T |

OTHER PUBLICATIONS

Geodolite 3A, Spectra–Physics, Inc., Brochure, 3–1968.

Primary Examiner—Samuel Feinberg
Assistant Examiner—S. C. Buczinski
Attorney—Spencer & Kaye

[57] ABSTRACT

Target positioning apparatus for use in aerial surveying has a viewing device and a laser alignment device for respectively approximately and accurately positioning a helicopter above a predetermined point on a terrain, and a height measuring device and horizontal distance measuring equipment which are automatically operated by the laser beam.

10 Claims, 3 Drawing Figures

AERIAL SURVEY

CROSS REFERENCE TO RELATED APPLICATION

This application is a division of application Ser. No. 65,259, filed Aug. 19, 1970, now U.S. Pat. No. 3,709,607 which itself is a continuation of Ser. No. 817,448, filed April 18, 1969, and now abandoned.

This invention relates to target positioning apparatus and methods for use in aerial surveying.

Surveying has for many years been one of the most important aspects of mining, petroleum or other field operation, and it is a time-consuming procedure. All surveys rest primarily on linear measurements for the direct determination of distances. In non-wooded, accessible areas, surveying has historically been carried out by surveyors using transits and stadia poles. Often the system of surveying known as triangulation (which utilizes the simple geometrical princple that if one side and two angles of a triangle are known, the measurements of the rest of the triangle can be computed) is used. Thus, linear measurements may be supplemented by angular measurements. This enables distances to be determined over areas which cannot be measured directly, as, for example, hilly or broken ground.

In wooded areas and in relatively inaccessible areas, both distance and angle measuring devices (transits and theodolites) placed at ground level cannot be used. Accordingly, it has been the practice to build a tower on top of which sits a slave or master station, thus giving a line of signt above the treetops for 20 to 30 miles distance. A portable steel observation tower, as for example that known under the trade name Bilby Tower, has frequently been used. Such an observation tower is like a giant tripod, extensible to over 100 feet, and is provided with an inner tripod which holds the transit or theodolite, but does not vibrate at the movements of the surveyors who stand on the separate outer tower. The task of building or erecting such towers in remote areas has been facilitated in recent years by the use of helicopters, which can transport both the men and the materials.

However, the building or erecting of such towers is an expensive and time-consuming task. Consequently it has been suggested that the helicopter could be used as a sighting target, if it could hover accurately over a point on the terrain. The practical success of such a proposal depends upon: firstly, the provision of accurate means of measuring the distance from a fixed point (in line of signt with and distant from the helicopter) to the helicopter; secondly, the provision of sufficient hovering accuracy for the helicopter; and thirdly, the provision of a satisfactory hover sight.

The first problem has been solved by use of a tellurometer, which is a distance measuring device utilizing line-of-sight radio waves. It is, in effect, a two-way radio telephone system which operates between a master unit and a remote unit. The second problem has been solved by provision, in the helicopter, of a stability augmentation system which allows for a more accurate hovering technique.

It has been suggested to solve the third problem and also to provide an accurate surveying system and technique that the following procedure be utilized. A helicopter is fitted with a vertical rod (like a stadia pole) located at the centre of the top of the helicopter. Also installed in the helicopter and precisely located in the centre bottom of the machine is a plumb bob on a string, attached to a drum mechanism, for measuring the distance of the helicopter above the ground. By looking through a series of mirrors located in the pilot's compartment of the helicopter, the pilot can see the string and plumb bob and a station mark below him. The pilot can raise or lower the helicopter to accommodate the height of the trees. He can also manoeuvre until the extended plumb bob is located exactly over the station mark. He can then attempt to hold the helicopter in this fixed position while another member of the survey crew, using a tellurometer, takes a reading on the vertical pole attached to the top of the helicopter. The helicopter may also have attached to the top thereof a Grimes beacon or a strobe light, in order that the general direction could be determined by the tellurometer operator in the distance. The height of the helicopter is measured by calibrating the plumb bob string. The pilot and the tellurometer operator are in radio contact so that the pilot can inform the operator when the plumb bob is precisely over the station mark in a position for a reading to be taken.

While this system and procedure has proven fairly accurate, it is quite expensive. Furthermore, the accuracy is impaired by the fact that wind and turbulence created by the helicopter may have an effect on the stability of the plumb bob line. Consequently, the stadia pole atop the helicopter may not be along a line exactly vertical to the station mark.

It is an object of one aspect of this invention to provide an accurate and economically feasible system for aerial surveying. An object of another aspect of this invention is the provision of an accurate and economically feasible procedure for aerial surveying.

In addition, it is an object of another aspect of this invention to provide a control and actuating mechanism which can aid in the operation of surveying equipment, and contribute to an accurate and feasible system for aerial surveying.

By one aspect of this invention there is provided a target positioning apparatus adapted to aid in the survey location of a predetermined point therebeneath. The target positioning apparatus comprises a helicopter, means mounted on the helicopter enabling the pilot thereof to view the terrain beneath the helicopter when it is airborne, and a laser alignment means for indicating when the helicopter is positioned vertically over the point whose location it is desired to fix by survey and a distance measuring device for measuring the horizontal position and for height of the helicopter. The hover sight preferably includes a laser capable of projecting a laser beam directed vertically between the helicopter and the point to be located. Additionally, a closed-circuit television system mounted on the helicopter may be provided; the camera being directed to scan the terrain beneath the helicopter when it is airborne and the viewing screen being positioned such that it can be seen by the pilot thereof.

Another aspect of this invention relates to a method of surveying the location of a predetermined point whose position it is desired to determine at a given time. A helicopter hovers generally above the point. The next step is the projection of a laser beam vertically between the helicopter and the point. The helicopter is then positioned accurately over the point by reference to the laser beam, and survey measurements then are taken.

In accordance with the preferred practice of the present invention, a closed-circuit television system is provided on the helicopter which aids the pilot in seeing beneath the aircraft and in locating over the point on which it is desired to obtain a fix, and a laser beam directed vertically between the helicopter and the station mark is utilized as a hover sight to indicate when the aircraft is positioned vertically over the point to be located. In one embodiment of the invention the laser beam is projected vertically upward from the terrain beneath the helicopter and a laser beam detector mounted on the helicopter informs the pilot when he is accurately over the mark; optionally, the laser detector may be utilized to trigger the operation of automatic distance measuring equipment.

It has been found advantageous in some circumstances to utilize a closed-circuit television system in which the camera is mounted in the helicopter by means of well-lubricated gimbal rings such that the camera is free to maintain an attitude substantially vertical to the earth when the helicopter is airborne. Also, the television console with viewing screen is best located adjacent the instrument panel of the helicopter where it can be seen easily by the pilot. In such practice of this invention, the laser may be mounted on the television camera which is kept vertical to the earth; the laser projecting a beam onto the terrain for viewing from the helicopter. Alternatively, as mentioned in the preceding paragraph, the laser can be positioned over the point in such a manner as to project a laser beam vertically upward from the point. A laser beam detector mounted on the helicopter indicates when the helicopter is accurately positioned over the point.

Another feature of the invention is the provision of a control and actuating mechanism responsive to the detection of a laser beam, which mechanism can be utilized to aid in the operation of survey apparatus and in the accurate positioning of the helicopter over the point.

In order to take the desired survey may be for example, horizontal distance measuring equipment such as autotape or tellurometer position fixing devices. Further there is usually a the height measuring device also associated with the helicopter which is capable of accurately determining the distance between the hovering helicopter and the point may be, for example, a calibrated, spring-loaded plumb bob and reel.

If desired, the laser beam detector can be utilized to activate certain preselected mechanisms associated with the helicopter upon detection of the laser beam projected vertically upward. It can be used, for example, to automatically activate the horizontal distance measuring equipment. The detector can comprise plural detection cells, at least one such cell indicating that the helicopter is positioned accurately over the point, and at least another of the cells indicating when the helicopter has drifted such that it is not positioned over the point. The different cells can be used to activate and positively deactive the distance and height measuring device. The plural cells of the laser beam detector can be arranged in the form of two concentric rings of cells in order to operate as outlined above.

Therefore, the present invention provides a control and actuating mechanism which is particularly suited to use in survey work, although it can find application in other situations wherein a laser beam is utilized and reference is made thereto for actuation and control of other equipment. The mechanism includes a laser beam receiver with first means for sensing a predetermined desired condition and in response to the presence of that condition for initiating operation of a preselected mechanism, and second means for sensing a predetermined undesired condition and in response thereto discontinuing operation of a preselected mechanism. In a preferred embodiment, the control and actuating mechanism utilizes a laser beam detector having plural detection cells. A first cell upon sensing the presence of a desired condition initiates operation of a preselected mechanism. A second cell upon sensing the presence of a predetermined undesirable condition positively discontinues operation of a preselected mechanism.

As an example, if the control and actuating mechanism is mounted in a helicopter for use in survey work, the desired condition can be met when the hovering helicopter is accurately positioned vertically above a point on the terrain, and the undesired condition may be achieved when the helicopter is no longer accurately positioned over that point. Consequently, when the first means in the laser beam receiver, i.e. a first detection cell, senses the laser beam and that therefore the helicopter is accurately positioned over the survey point, the distance measuring devices and the Grimes beacon or strobe light can be activated and their operation commenced. When the second means in the laser beam receiver, i.e. the second detection cell, senses that the helicopter has drifted, i.e. is no longer accurately positioned over the station mark, the operation of the distance measuring devices and the Grimes beacon or strobe light can be terminated.

Another example of the actuation of a preselected mechanism would be the release of the plumb bob reel mechanism when the helicopter is accurately positioned over the survey point, so that the perpendicular distance of the helicopter over the survey point at that time can be measured.

In the preferred procedure aspect of this invention, the method of surveying the location of a predetermined point comprises the steps of: (1) providing a helicopter equipped with a laser beam detector on the underside and hovering generally above the point, (2) projecting a laser beam vertically upward from a laser located directly over the point, (3) detecting when said helicopter is positioned accurately over the point by reference to the laser beam detector, and (4) taking survey measurements when the helicopter is so positioned.

The helicopter which is used in the system and procedure of aspects of this invention preferably is one which is equipped with a stability augmentation system, which aids in a more accurate hovering technique than may be otherwise possible. One such helicopter is known under the trade name Hiller model SL4, and is manufactured by the Hiller Helicopter Company. Another such helicopter is the Bell 47 model 3B-1 helicopter.

The laser can be attached to any normal instrument, and in the present invention, it is a portable laser preferably of the type known as a transit-laser. The inherent characteristics of a laser, namely the emission of an intense beam of coherent light (red in colour in a ruby laser) which is clearly visible either at night or in daylight, are used to advantage. Since the laser beam remains essentially parallel and does not expand as it travels over long distances, the laser beam is analogous to an endless, weightless, stretched string which is visible over a great distance. It becomes, in effect, a clearly visible reference line.

A transit-laser beam is clearly visible on a target one thousand feet away as a spot whose centre can be judged to within about one-half inch. Simple detectors (for example goggles) are available, which by filtering out extraneous light in effect permit greater viewing range. In addition, the operator may use a retroreflector which will pick up the beam at a substantial range allowing the operator to know whether or not he is constantly on target. Should his instrument be jarred for any reason, the retroreflector will make him aware that such has happened. At night, the transit-laser beam is visible for a distance of up to about ten miles. One commercially available laser which may be used in the practice of this invention is known as the University Laboratories Model 610 transit-laser.

The means associated with the helicopter for the taking of distance measurements may be simple or sophisticated. One such simple means is a sight light by which transit readings may be taken from two known locations. Alternatively an autotape or a position-fixing device such as the model MRB3 of Tellurometer Canada Limited may be used; these devices can be adapted to be activated electronically by a laser detector. Upon reception of the laser beam, the laser detector then activates the autotape or the MRB3 which automatically takes distance readings on remote units located at known locations.

The closed-circuit television system which can be used in the various aspects of this invention preferably is one which has high resolution, even under the conditions of vibration and other problems associated with helicopter operation, in order to provide a clear picture. One such commercially available system is manufactured under the brand name of Sony closed circuit television set.

The camera of the closed circuit television system in one embodiment may be mounted pointing down and ahead through the tail boom of the helicopter. The viewing console of the television system normally is placed in front of the rudder pedals of the helicopter and is used by the pilot to enable him to face his instrument panel and still be able to see underneath his machine, thus facilitating his hovering over a fixed point. The closed circuit television system enables the helicopter to hover over a station mark and to obtain a "fix" over such station mark. In another embodiment, the television camera preferably is mounted on well-lubricated and ball-bearinged gimbal rings. Thus, regardless of the attitude of the helicopter, the camera is free to move so that it is perpendicular with the ground at all times when the helicopter is airborne.

In a preferred embodiment of the present invention, a laser beam detector is mounted on the helicopter, a good position being in front of the vertically directed television camera lens. The laser detector may, for example, be a single cell, or preferably may consist of two concentric rows of laser beam sensitive cells. These rows of cells can be used to activate preselected mechanisms mounted on the helicopter upon reception of the beam from the laser mounted over the station mark below.

In a second embodiment of this invention, the laser can be mounted on the helicopter so that the laser beam is centrally located in line with the sighting mechanisms on the helicopter and is always pointing vertically downward. In this way the pilot can see, by means of the closed circuit television set, the positioning of the helicopter by observing the laser beam with respect to the station mark on the ground below.

It is an additional advantage in the practice of this invention that a tape recording of the television operations can be made and preserved. This tape recording could be reviewed later, after the field work is completed, should it be necessary to check the survey results.

The laser beam is used to provide an accurate positioning of the hovering helicopter over a station mark. The accurate measurement of the helicoper height would normally be carried out by using a plumb bob string attached to a calibrated drum. When the plumb bob touches the station mark, the exact height above the station mark can be read.

It is to be observed that reference has been made to a "station mark." Other well-known survey points, such as bench marks, triangulation station marks, traverse station marks and corner monuments, azimuth marks, etc. are also interchangeable with station marks, and indeed, any point whose position it is desired to fix at a given time may be designated as a "station mark."

Reference now will be made to the accompanying drawings which will illustrate the practice of the invention according to one embodiment thereof:

Figure 1:
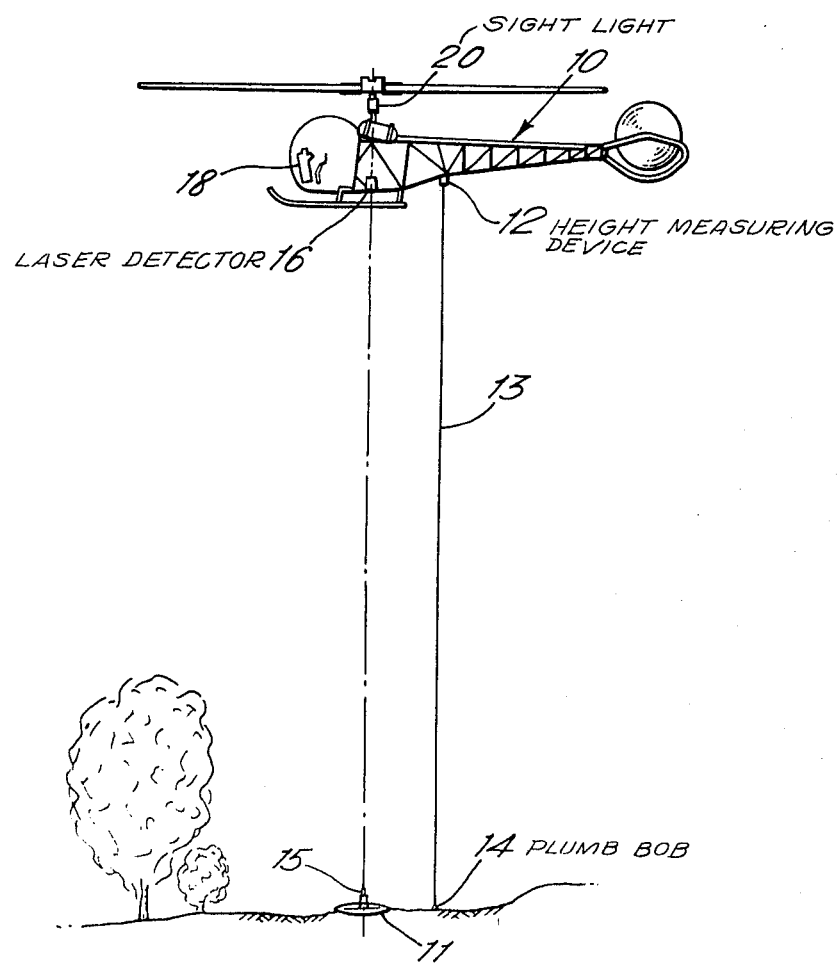
FIG. 1 is a schematic view of a helicopter hovering over a station mark undertaking survey work from the air.

FIG. 1 shows a hovering helicopter 10 (which may be a Bell 47 model 3B1 helicopter) hovering over a station mark 11, namely a point whose position it is desired to locate. The helicopter is provided with a height measuring device 12, which in the embodiment shown includes a plumb line 13 and a plumb bob 14. Alternatively, although not shown, the helicopter may be provided with a stadia rod incorporated in the bottom thereof which can be read through a telescope on the ground to obtain the measure of the vertical height of the helicopter above the station mark. The helicopter is provided with a laser detector 16 mounted on the left cargo rack. The detector 16 is adapted to receive the laser beam projected by a laser 25 situated over bench mark 11. Directly above the detector 16 is the lens of a television camera 17, the screen 19 of which is mounted adjacent the helicoper instrument panel 18. Directly above the television camera 17 is a sight light 20, which may be a Grimes beacon or a strobelite. This equipment is used to locate the point at station mark 11 in the horizontal plane.

Figure 2:
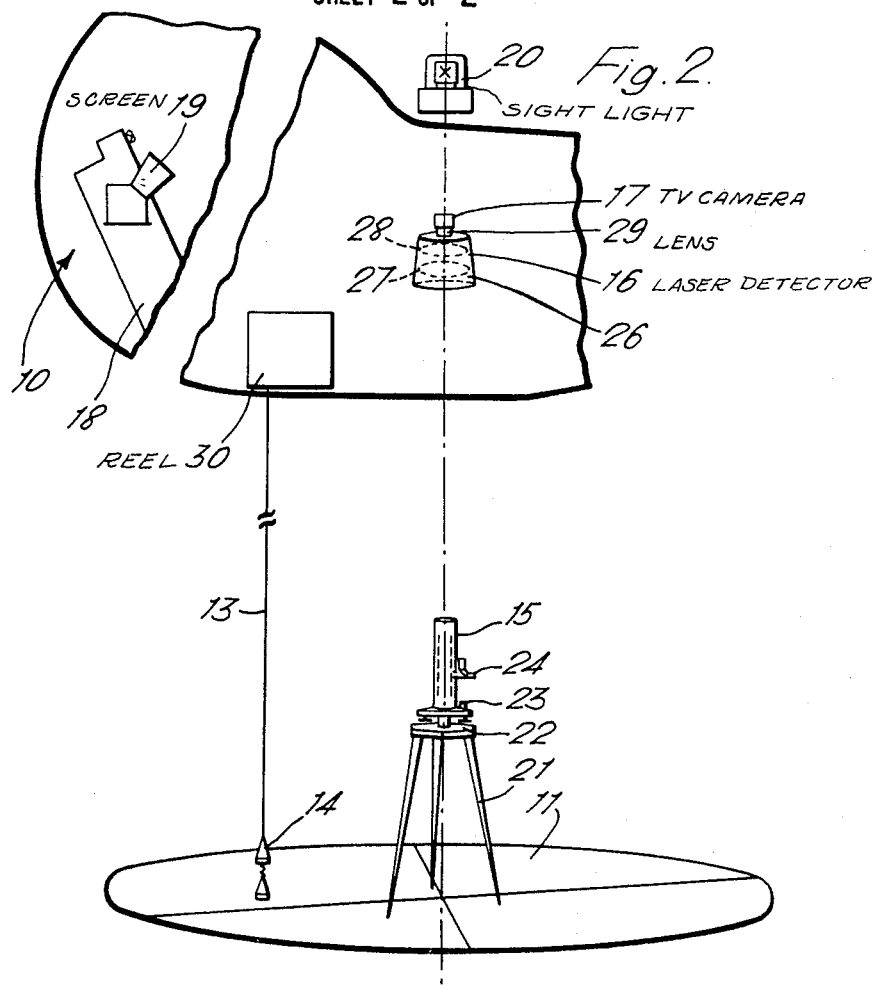
FIG. 2 is a view in more detail of the instrumentation utilized in the surveymethod shown in FIG. 1.

As seen more clearly in FIG. 2, the altitude measuring device 12 includes a plumb bob 14 and reel 30, the reel being calibrated and spring loaded, and provided with a weight sensitive indicator. The spring release in the system records the instant that plumb bob 14 touches the terrain, thus giving the vertical height of the calibrated drum 30 above the station mark 11.

Over station mark 11 is a tripod 21, on the bench 22 of which is mounted a level 23, a vertical telescope 24, and a transit-laser 25. The laser detector 16 includes a dome 26 provided with two internal concentric rows of laser beam sensitive cells 27 and 28, which may be photovoltaic or photoresistance cells. The lens 29 of television camera 17 is in direct vertical line with the laser detector 16. The instrument panel is also provided with indicator lights 31 to be more fully described with reference to FIG. 3.

While not shown survey method FIG. 2, the rows 27 and 28 of laser beam sensitive cells may be coupled to the sight light and to the electronic distance measuring equipment, e.g., an autotape or position fixing device known as model MRB3 of Tellurometer Canada Limited. The measuring means could be activated when the detector 16 receives the beam of the laser 25; thus automatic distance readings may be taken on two remote units, one located at each of two known locations.

Figure 3:
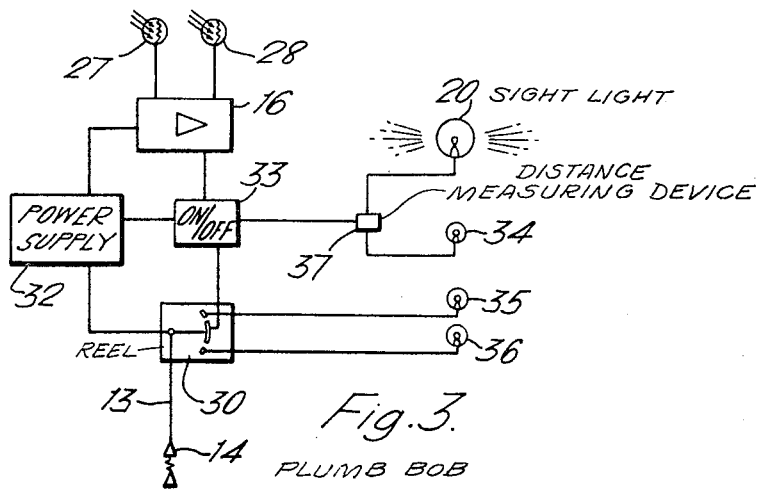
FIG. 3 is a schematic electrical diagram of the control and actuating mechanism and associated instrumentation, utilized in the practice of this invention in conjunction with the equipment illustrated in FIG. 2.

FIG. 3 schematically illustrates the electrical circuit diagram. A power supply 32 is operatively connected to the dome 26 of the laser detector, to an on/off switch 33 and thence to a distance measuring device 37, to the sight light 20, and to the sight light indicator light 34. The power supply is also connected to the motor of the calibrated drum 30, which is in turn connected to two indicator lights 35 and 36 on the instrument panel. The dome 26 of the laser receiver 16 is also connected to on/off switch 33.

In operation, the pilot positions himself utilizing the closed circuit television system. The viewing console with screen 19 is mounted adjacent the instrument panel for easy line-of-vision requiring a minimum of eye movement by the pilot from the RPM indicator. It is preferred that cross-hairs be placed on the console face to assist the pilot in positioning the helicopter 10 over the station mark 11. Two-way radio communication between the pilot and a man on the ground may also be used as an alternative positioning method.

As the helicopter manoeuvres over the survey point the dome 26 receives the laser beam from laser 25, and the beam will first fall on at least one of the outer row of detection cells 27. This will produce no change since the switch 33 will already be in the off position. When the laser beam is detected by one of the inner row of cells 28, indicating that the helicopter is positioned vertically above the beam of laser 25, switch 33 closes and sight light 20, indicator light 34, and distance measuring equipment 37 will be turned on. If the helicopter "drifts" off from the vertical, one of the outer row of detection cells 27 will be triggered opening switch 33 and positively discontinuing operation of equipment 37 and lights 20 and 34. The turning on and off of switch 33 in response to signals generated by the detection cells can be used to initiate and terminate indicator lights, a sight light, and horizontal and vertical distance measuring equipment.

Indicator light 35 may be a green light and indicator light 36 a red light. They are controlled by a tension spring in the line 13, with the green light 35 being on until the plumb bob 14 touches the ground, at which time the green light 35 goes out and the red light 36 comes on. These two lights are in the pilot's line of sight, either on the helicopter instrument panel or on top of the television viewing console. These lights optionally could be eliminated or verified by the use of a two-way radio on the occasions where a man is stationed on the ground by the station mark.

We claim:

1. Target positioning apparatus for use in aerial surveying comprising a helicopter, means mounted on said helicopter enabling the pilot thereof to view the terrain beneath the helicopter when it is airborne, and laser alignment means for indicating when said helicopter is positioned vertically over a point on the terrain whose location it is desired to fix by survey, said laser alignment means including a laser capable of projecting a laser beam directed vertically between said helicopter and said point, a laser detector for detecting the laser beam, one of said laser and said laser detector being mounted on said helicopter, means for indicating to the pilot when the laser beam is aligned with said laser detector, and a distance measuring apparatus associated with said helicopter capable of determining the distance between the helicopter and said point.

2. Target positioning apparatus as defined in claim 1 wherein said laser detector is mounted on said helicopter, and further comprising electric circuit means connected to said laser detector for providing an output signal in response to alignment of the laser beam with said laser detector, said distance measuring apparatus comprising horizontal distance measuring apparatus operable in response to the output signal of said electric circuit means.

3. Target positioning apparatus as claimed in claim 2, wherein said laser detector comprises first and second laser sensing cell means responsive to said laser beam for providing first and second signals, respectively, controlling said electric circuit means, said electric circuit means including means for initiating and discontinuing operation of said distance measuring device in response to said first and second signals, respectively.

4. Target positioning apparatus as claimed in claim 1, wherein said laser detector is mounted on said helicopter, and further comprising electric circuit means connected to said laser detector for providing an output signal in response to alignment of the laser beam with said laser detector, said distance measuring device comprising a height measuring device operable in response to said output signal for measuring the distance of said helicopter above said point.

5. Target positioning apparatus as claimed in claim 4, wherein said laser detector comprises first and second laser sensing cell means responsive to said laser beam for providing first and second signals, respectively, controlling said electric circuit means, said electric circuit means including means for initiating and discontinuing operation of said distance measuring device in response to said first and second signals, respectively.

6. Target positioning apparatus as claimed in claim 2, wherein said distance measuring aparatus comprises a height measuring device for measuring the distance of said helicopter above said point.

7. A method of surveying the location of a predetermined point on a terrain, which comprises the steps of viewing the terrain below the helicopter and to facilitate manoeuvering of the helicopter into a position generally above said point, projecting a laser beam vertically between said helicopter and said point, positioning said helicopter accurately over said point by reference to said laser beam, and taking survey measurements while said helicopter is accurately positioned over said point.

8. A method as defined in claim 7 wherein said laser beam is projected vertically downward from said helicopter, and said helicopter is positioned accurately over said point by observation of the location of said beam relative to said point.

9. A method as defined in claim 7, which includes initiating the operation of distance measuring equipment associated with said helicopter in response to a signal generated by a laser detector on said helicopter indicating that the helicopter is accurately positioned over said point.

10. A method as claimed in claim 9, which includes subsequently discontinuing operation of the distance measuring equipment by using said laser detector to sense when said helicopter has moved from over said point.

* * * * *

UNITED STATES PATENT OFFICE
CERTIFICATE OF CORRECTION

Patent No. 3,765,766     Dated October 16th, 1973

Inventor(s) Frederick C. McConnell, George Jason and Neil J. Armstrong

It is certified that error appears in the above-identified patent and that said Letters Patent are hereby corrected as shown below:

In the heading of the patent, after line 7, insert:

--[73] Assignee: Spartan Air Services Limited, Ottawa, Ontario, Canada--.

Column 1, line 18, change "princple" to --principle--; line 30, change "signt" to --sight--; line 49, change "signt" to --sight-- Column 2, line 46, delete "and a". Column 3, line 43, delete "there is usually a"; same line, delete "also"; line 44, delete "associated". Column 6, line 14, change "helicoper" to --helicopter--; line 33, change "surveymethod to --survey method--; line 54, change "helicoper" to --helicopter--. Column 7, line 9, change "survey method" to --in--. Column 8, line 52, change "aparatus" to --apparatus--.

Signed and sealed this 23rd day of April 1974.

(SEAL)
Attest:

EDWARD M.FLETCHER,JR.
Attesting Officer

C. MARSHALL DANN
Commissioner of Patents